(12) United States Patent
Curry et al.

(10) Patent No.: US 12,294,499 B1
(45) Date of Patent: May 6, 2025

(54) PLUGGABLE TRANSCEIVER TO FACILITATE NETWORK TRAFFIC ANALYSIS

(71) Applicant: VIAVI Solutions Inc., Chandler, AZ (US)

(72) Inventors: Jason Curry, Raleigh, NC (US); Seisaku Nomura, Waynesboro, PA (US); Mark Gunville, Hampton, NH (US); Michael Sack, Linden, MI (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/501,305

(22) Filed: Nov. 3, 2023

(51) Int. Cl.
*G06F 15/173* (2006.01)
*H04L 41/12* (2022.01)

(52) U.S. Cl.
CPC .................................. *H04L 41/12* (2013.01)

(58) Field of Classification Search
CPC ....................................................... H04L 41/12
See application file for complete search history.

(56) References Cited

U.S. PATENT DOCUMENTS

| | | | |
|---|---|---|---|
| 6,415,329 B1* | 7/2002 | Gelman | H04L 69/163 709/245 |
| 9,118,601 B2 | 8/2015 | Chouinard et al. | |
| 9,438,503 B2 | 9/2016 | Coomber et al. | |
| 10,659,569 B1* | 5/2020 | Tourrilhes | H04L 61/2514 |
| 2017/0223151 A1* | 8/2017 | Brunner | H04L 69/22 |
| 2017/0251026 A1* | 8/2017 | Straub | H04L 65/611 |
| 2019/0104076 A1* | 4/2019 | Seetharaman | H04L 45/64 |

* cited by examiner

*Primary Examiner* — Duyen M Doan
(74) *Attorney, Agent, or Firm* — Harrity & Harrity, LLP

(57) ABSTRACT

A pluggable transceiver receives, from a client, a first message that indicates a first source IP address as being an IP address of a client, a first destination IP address as being an IP address of the pluggable transceiver, a first source port as being a port of the client, and a first destination port as being a port of the pluggable transceiver. The pluggable transceiver updates the first message to indicate the first source IP address as being the IP address of the pluggable transceiver, the first destination IP address as being an IP address of a server, and the first destination port as being a port of the server. The pluggable transceiver sends the updated first message to the server.

20 Claims, 8 Drawing Sheets

PLUGGABLE TRANSCEIVER TO FACILITATE NETWORK TRAFFIC ANALYSIS

BACKGROUND

A pluggable transceiver is a device used to connect to other devices in a networking environment. The pluggable transceiver can transmit and receive data to facilitate analysis of connections between the pluggable transceiver and the other devices.

SUMMARY

In some implementations, a pluggable transceiver is configured to: receive, from a client network device, a first message that indicates a first source Internet protocol (IP) address as being an IP address of the client network device, a first destination IP address as being an IP address of the pluggable transceiver, a first source port as being a port of the client network device, and a first destination port as being a port of the pluggable transceiver; update the first message to indicate the first source IP address as being the IP address of the pluggable transceiver, the first destination IP address as being an IP address of a server network device, and the first destination port as being a port of the server network device; send, to the server network device, the updated first message; receive, from the server network device, a second message that indicates a second source IP address as being an IP address of the server network device, a second destination IP address as being the IP address of the pluggable transceiver, a second source port as being a port of the server network device, and a second destination port as being the port of the client network device; update the second message to indicate the second source IP address as being the IP address of the pluggable transceiver, the second destination IP address as being the IP address of the client network device, and the second source port as being the port of the pluggable transceiver; and send, to the client network device, the updated second message.

In some implementations, a pluggable transceiver is configured to: receive a first message that includes a first network layer header and a first transport layer header, wherein the first network layer header indicates a first source IP address as being an IP address of a client and a first destination IP address as being an IP address of the pluggable transceiver, and wherein the first transport layer header indicates a first source port as being a port of the client and a first destination port as being a port of the pluggable transceiver; update the first network layer header and the first transport layer header of the first message to indicate the first source IP address as being the IP address of the pluggable transceiver, the first destination IP address as being an IP address of a server, and the first destination port as being a port of the server; send, after updating the first network layer header and the first transport layer header of the first message, the first message; receive a second message that includes a second network layer header and a second transport layer header, wherein the second network layer header indicates a second source IP address as being an IP address of the server and a second destination IP address as being the IP address of the pluggable transceiver, wherein the second transport layer header indicates a second source port as being a port of the server and a second destination port as being the port of the server; update the second network layer header and the second transport layer header of the second message to indicate the second source IP address as being the IP address of the pluggable transceiver, the second destination IP address as being the IP address of the client, and the second source port as being the port of the pluggable transceiver; and send, after updating the second network layer header of the second message, the second message.

In some implementations, a method includes receiving, by a pluggable transceiver, a first message that indicates a first source IP address as being an IP address of a client, a first destination IP address as being an IP address of the pluggable transceiver, a first source port as being a port of the client, and a first destination port as being a port of the pluggable transceiver; sending, by the pluggable transceiver, the first message, wherein the first message is updated to indicate the first source IP address as being the IP address of the pluggable transceiver, the first destination IP address as being an IP address of a server, and the first destination port as being a port of the server; receiving, by the pluggable transceiver, a second message that indicates a second source IP address as being an IP address of the server, a second destination IP address as being the IP address of the pluggable transceiver, a second source port as being a port of the server, and a second destination port as being the port of the server; and sending, by the pluggable transceiver, the second message, wherein the second message is updated to indicate the second source IP address as being the IP address of the pluggable transceiver, the second destination IP address as being the IP address of the client, and the second source port as being the port of the pluggable transceiver.

DETAILED DESCRIPTION

Figure 1:
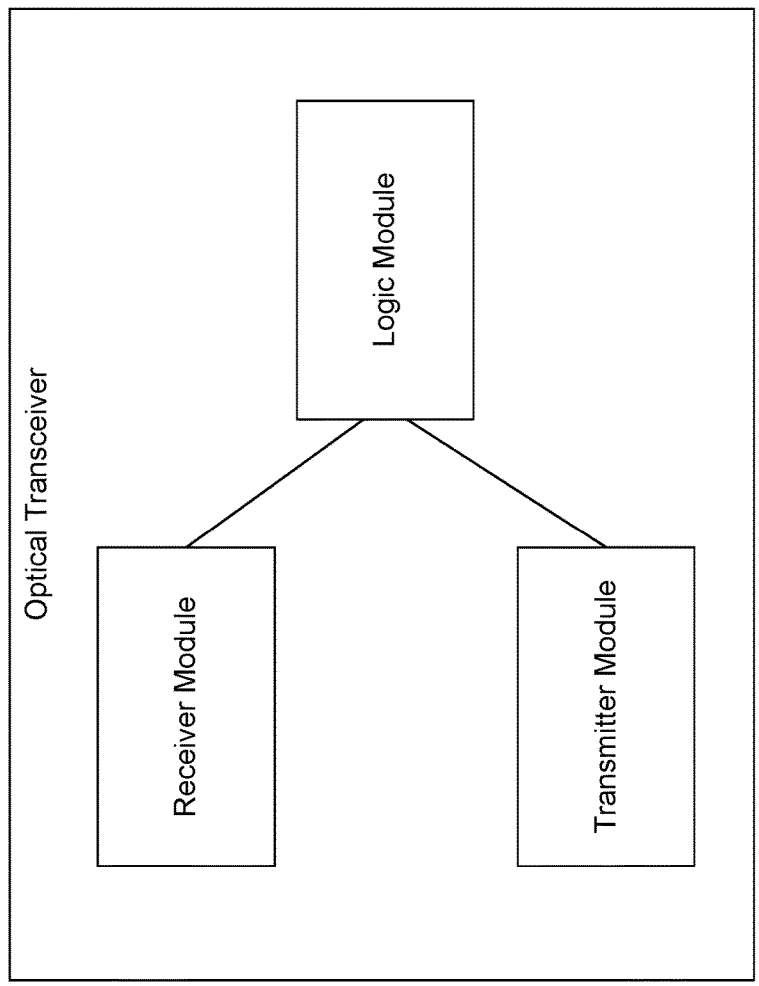
FIG. 1 is a diagram of an example implementation of a pluggable transceiver.

The following detailed description of example implementations refers to the accompanying drawings. The same reference numbers in different drawings may identify the same or similar elements.

A pluggable transceiver can be used as a test point to facilitate testing of connections between network devices of a network. The pluggable transceiver can be used to provide a "loopback" functionality (e.g., for sending packets received from an origin network device back to the origin network device) for facilitating analysis of packets that are associated with a layer 2 (data link layer) of the open systems interconnection (OSI) model. However, analysis of connections between network devices, such as at a layer 3 (network layer), a layer 4 (transport layer), or higher, of the OSI model are needed to facilitate analysis of network traffic at these higher layers (e.g., in terms of throughput, bandwidth, latency, and/or other performance parameters).

Some implementations described herein include a pluggable transceiver. The pluggable transceiver is configured to be included in a network device, to connect to a client (e.g., a client network device) via a first network segment, and to connect to a server (e.g., a server network device) via a second network segment. To facilitate testing of the first network segment (e.g., at layer 3, at layer 4, or higher, of the OSI model), the pluggable transceiver may modify and forward network traffic (e.g., layer 3 network traffic or layer 4 network traffic) to enable communication between the client and the server.

For example, the pluggable transceiver may receive a first message (e.g., a transmission control protocol (TCP) message, a user datagram protocol (UDP) message, a TCP/IP message, or another type of message) from the client. The first message may comprise a network layer header that indicates a first source IP address as being an IP address of the client and a first destination IP address as being an IP address of the pluggable transceiver, and may comprise a transport layer header that includes a first source port as being a port of the client and a first destination port as being a port of the pluggable transceiver. The pluggable transceiver may update the network layer header and the transport layer header of the first message to cause the first source IP address to indicate the IP address of the pluggable transceiver, the first destination IP address to indicate an IP address of the server, and the first destination port to indicate a port of the server. The pluggable transceiver then may send the first message to the server.

As an additional example, the pluggable transceiver may receive a second message (e.g., a TCP message, a UDP message, or a TCP/IP message that is a response to the first message) from the server. The second message may comprise a network layer header that indicates a second source IP address as being an IP address of the server and a second destination IP address as being the IP address of the pluggable transceiver, and may comprise a second transport layer header that indicates a second source port as being the port of the server and a second destination port as being the port of the client. The pluggable transceiver may update the network layer header and the transport layer header of the second message to cause the second source IP address to indicate the IP address of the pluggable transceiver, the second destination IP address to indicate the IP address of the client, and the second source port as being the port of the pluggable transceiver. The pluggable transceiver then may send the second message to the client.

In this way, the pluggable transceiver may allow network traffic (e.g., comprising the first message and the second message) to be communicated between a client and a server for testing of a network segment (e.g., for analysis of network traffic communicated via the network segment) between the client and the pluggable transceiver. Notably, by updating the network traffic to allow the network traffic to be communicated between the client and the server, the pluggable transceiver facilitates analysis of higher layer network traffic, such as layer 3 (of the OSI model) traffic, layer 4 (of the OSI model) traffic, and higher. For example, the client may be able to analyze messages sent to, and messages received from, the pluggable transceiver to determine throughput, bandwidth, latency, and/or other performance parameters of network traffic (e.g., layer 3, layer 4, or higher, network traffic) communicated via the network segment between the client and the pluggable transceiver.

Further, by enabling the network traffic to be forwarded to and from the server, the pluggable transceiver does not need to include a server functionality, and therefore does not need to include computing resources (e.g., processing resources, memory resources, communication resources, and/or power resources, among other examples) that are needed to support a server functionality. In this way, the pluggable transceiver can be referred to as a "light weight" pluggable transceiver, and can be included in any network device that has an available physical interface. This allows for the pluggable transceiver to be used at different "points" within a network, such as a point in a network where including a server or a "heavy weight" pluggable transceiver (e.g., that includes a server functionality) is not possible or practical. Accordingly, in many cases, the pluggable transceiver enables analysis of network traffic (e.g., layer 3, layer 4, or higher, network traffic) at more points within a network than is practically available.

FIG. 1 is a diagram of an example implementation 100 of a pluggable transceiver. The pluggable transceiver may be a small form-factor pluggable (SFP) pluggable transceiver, or another type of pluggable transceiver, that is configured to be included in a network device. That is, the pluggable transceiver may be configured to be inserted into a physical interface of the network device, and may provide one or more physical interfaces (e.g., optical interfaces, electrical interfaces, opto-electrical interfaces, or other types of interfaces) for connecting to other network devices (e.g., via network segments). Accordingly, the pluggable transceiver may be configured to facilitate network traffic analysis, as further described herein. For example, the pluggable transceiver may be connected to another network device, via a network segment, to facilitate analysis of network traffic communicated over the network segment.

As shown in FIG. 1, the pluggable transceiver may include a receiver module, a transmitter module, and/or a logic module. The receiver module may include, for example, an input component, a communication component, and/or another type of receiver component. The pluggable transceiver may be configured to receive messages (e.g., respectively comprising one or more packets) using the receiver module (e.g., as further described herein). The transmitter module may include, for example, an output component, a communication component, and/or another type of transmitter component. The pluggable transceiver may be configured to send messages (e.g., respectively comprising one or more packets) using the transmitter module (e.g., as further described herein). The logic module may include, for example, a processor, one or more filters, one or more data structures (e.g., one or more first-in-first-out data structures and/or other data structures), and/or another type of logical component. The pluggable transceiver may be configured to update messages (e.g., respectively comprising one or more packets) using the logic module, such as by updating information include in one or more headers of the messages (e.g., as further described herein).

As indicated above, FIG. 1 is provided as an example. Other examples may differ from what is described with regard to FIG. 1.

FIGS. 2A-2D are diagrams of an example implementation 200 associated with facilitating network traffic analysis (e.g., of a network segment). As shown in FIGS. 2A-2D, example implementation 200 includes the pluggable transceiver (e.g., described in FIG. 1), a network device, a client, and a server. In some implementations, the client and the server may be each associated with another network device (e.g., may be hosted by the same network device), or, alternatively, the client may be associated with a first other network device (e.g., may be hosted by the first other network device, referred to as a client network device) and the server may be associated with a second other network device (e.g., may be hosted by the second other network device, referred to as a server network device). These devices are described in more detail below in connection with FIG. 3 and FIG. 4.

As shown in FIGS. 2A-2D, the pluggable transceiver may be associated with the network device (e.g., the pluggable transceiver may be a pluggable pluggable transceiver that is included in the network device). The pluggable transceiver may be configured to connect to the client via a network segment A, and may be configured to connect to the server via a network segment B. When the client and the server are associated with another network device (e.g., are hosted by the same network device), the network segment A and the network segment B may form a "loop" between the other network device and the pluggable transceiver. When the client is associated with a first other network device (e.g., is hosted by a client network device) and the server is associated with a second other network device (e.g., is hosted by a server network device), the pluggable transceiver may be referred to as being in the "middle," or "between" the client (e.g., the client network device) and the server (e.g., the server network device).

Each of the client, the pluggable transceiver, and the server may have an IP address and a port. For example, as shown in FIGS. 2A-2D, the client may have an IP address IP_A and a port Port_A, the pluggable transceiver may have an IP address IP_B and a port Port_B, and the server may have an IP address IP_C and a port Port_C. In some implementations, such as when the client, pluggable transceiver, and the server are associated with different network devices, the respective IP addresses and ports of the client, the pluggable transceiver, and the server may be different. Alternatively, such as when the client and the server are associated with the same network device, the IP address of the client and the IP address of the server may be the same (e.g., may have the same value). Further, to simplify updating of the messages (as further described herein), the port of the pluggable transceiver and the port of the server may be the same (e.g., may have the same value).

Figure 2A:
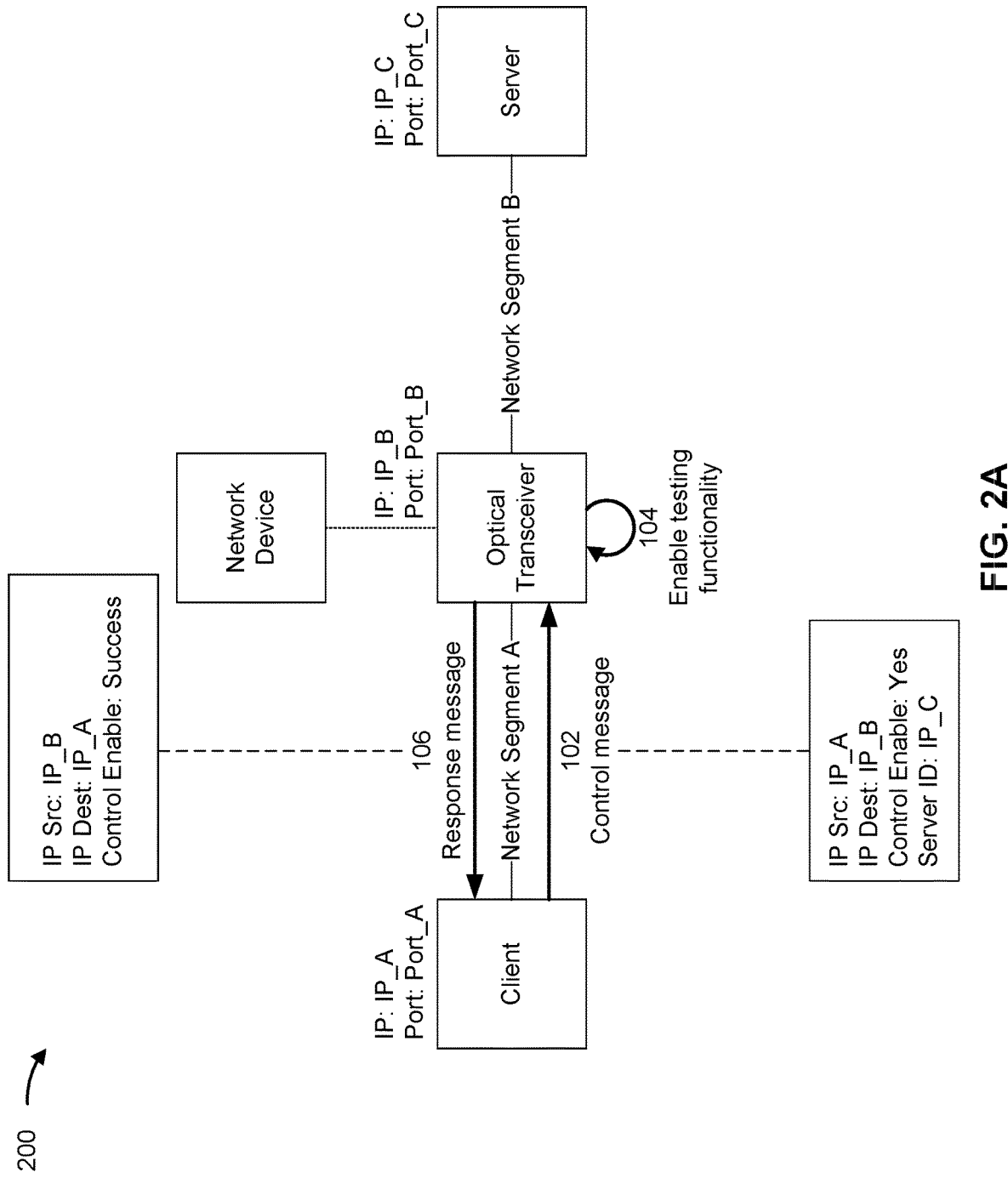
FIGS. 2A-2D are diagrams of an example implementation associated with facilitating network traffic analysis (e.g., of a network segment).

As shown in FIG. 2A, and by reference number 102, the client may send a control message to the pluggable transceiver. For example, the client may send the control message to the pluggable transceiver via the network segment A between the client and the pluggable transceiver. In this way, the pluggable transceiver may receive the control message from the client (e.g., via the network segment A).

The client may send the control message to the pluggable transceiver to initiate analysis of the network segment A (e.g., to initiate analysis of network traffic communicated via the network segment A). As shown in FIG. 2A, the control message may indicate a source IP address (IP Src) as being an IP address of the client (e.g., of the client network device) (IP_A); a destination IP address (IP Dest) as being an IP address of the pluggable transceiver (IP_B); a control enablement parameter (e.g., that indicates that the pluggable transceiver is to update messages, as described herein) (Control Enable: Yes); and/or a server identifier (Server ID) parameter that indicates an IP address of the server (e.g., of the server network device) (IP_C), such as to indicate that the server is to act as a server to facilitate testing of the network segment.

As shown by reference number 104, the pluggable transceiver may enable a testing functionality of the pluggable transceiver (e.g., based on the control message). For example, the pluggable transceiver may process (e.g., parse and/or read) the control message to determine (e.g., based on the source IP address, the destination IP address of the control message, and the control enablement parameter) that the pluggable transceiver is to facilitate analysis of a network segment between the client and the pluggable transceiver (e.g., the network segment A), and to determine (e.g., based on the server identifier parameter) that the pluggable transceiver is to update messages to allow the messages to be communicated between the client and the server. Accordingly, the pluggable transceiver may update a data structure (e.g., a table, a file, or another data structure) to indicate that the pluggable transceiver is to update messages from the client and/or from the server.

As shown by reference number 106, the pluggable transceiver may send a response message to the client. For example, the pluggable transceiver may send the response message to the client via the network segment A between the pluggable transceiver and the client. In this way, the client may receive the response message from the pluggable transceiver (e.g., via the network segment A).

The pluggable transceiver may send the response message to the client as an acknowledgement of the control message. For example, the pluggable transceiver may send the response message to the client to indicate that the pluggable transceiver has enabled the updating functionality of the pluggable transceiver (e.g., to facilitate analysis of network traffic communicated via the network segment A). As shown in FIG. 2A, the response message may indicate a source IP address (IP Src) as being the IP address of the pluggable transceiver (IP_B); a destination IP address (IP Dest) as being the IP address of the client (e.g., of the client network device) (IP_A); and a control enablement acknowledgement parameter (e.g., that indicates that the pluggable transceiver is configured to update messages, as described herein) (Control Enable: Success).

While FIG. 2A shows the client as initiating analysis of the network segment A, another device or system may be used. For example, a control system (not shown) that is configured to monitor and control the devices shown in FIG. 2A may initiate analysis of the network segment A. Accordingly, the control system, in a similar manner as that described above, may send the control message to the pluggable transceiver and may receive the response message from the pluggable transceiver.

Figure 2B:
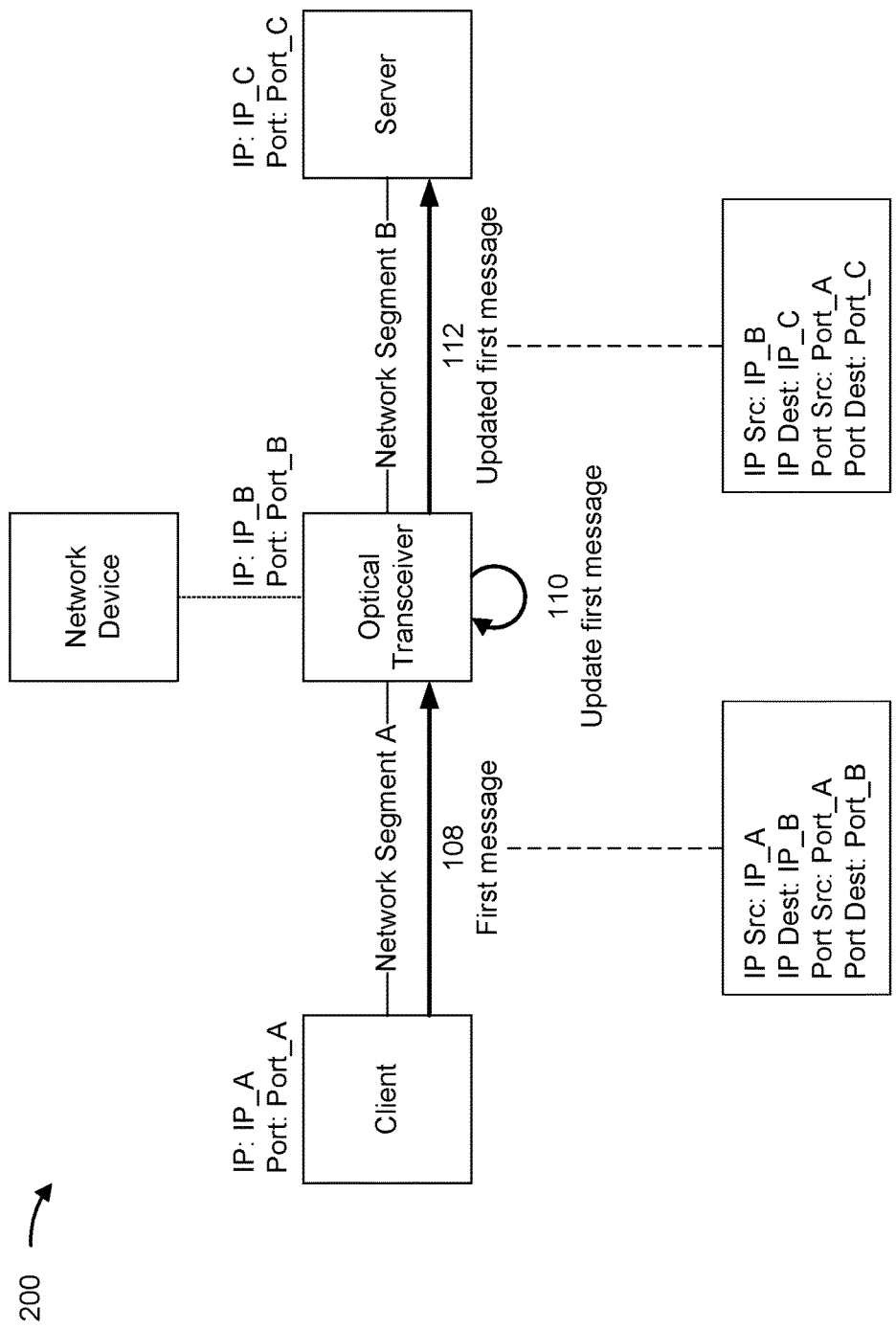

As shown in FIG. 2B, and by reference number 108, the client may send a first message to the pluggable transceiver (e.g., based on sending the control message and/or receiving the response message, as described herein in relation to FIG. 2A). For example, the client may send the first message to the pluggable transceiver via the network segment A between the client and the pluggable transceiver. In this way, the pluggable transceiver may receive the first message from the client (e.g., via the network segment A).

The client may send the first message to the pluggable transceiver as part of analyzing the network segment A. The first message may be a TCP message, a UDP message, a TCP/IP message, or another type of message. For example, the first message may be a TCP/IP synchronize (SYN) message, or another type of TCP/IP message. As shown in FIG. 2B, the first message may indicate a source IP address (IP Src) as being the IP address of the client (e.g., of the client network device) (IP_A); a destination IP address (IP Dest) as being the IP address of the pluggable transceiver (IP_B); a source port (Port Src) as being a port of the client (e.g., a port of the client network device, such as a TCP port) (Port_A); and/or a destination port (Port Dest) as being a port of the pluggable transceiver (e.g., a TCP port) (Port_B). In some implementations, the first message may include one or more headers, such as a network layer header (e.g., that includes information associated with layer 3 of the open systems interconnection (OSI) model) and/or a transport layer header (e.g., that includes information associated with layer 4 of the OSI model). Accordingly, the network layer header may include the source IP address and the destination IP address, and the transport layer header may include the source port and the destination port.

As shown by reference number 110, the pluggable transceiver may update the first message. For example, the pluggable transceiver, based on receiving the first message from the client, and based on the data structure (e.g., that indicates that the pluggable transceiver is to update messages from the client), may determine to update the first message. Accordingly, the pluggable transceiver may update the network layer header and/or the transport layer header of the first message. For example, as shown in FIG. 2B, the pluggable transceiver may update the first message to indicate the source IP address as being the IP address of the pluggable transceiver (IP_B), the destination IP address as being an IP address of the server (e.g., of the server device) (IP_C), and/or the first destination port as being a port of the server (e.g., a port of the server network device, such as a TCP port) (Port_C). Accordingly, when the network layer header includes a network layer checksum value (e.g., an IP checksum value) and/or the transport layer header includes a transport layer checksum value (e.g., a TCP checksum value), the pluggable transceiver may further update the first message to cause the network layer checksum value to be updated (e.g., using the updated source IP and the updated destination IP address) and/or to cause the transport layer checksum value to be updated (e.g., using the source port and the updated destination port).

As shown by reference number 112, the pluggable transceiver may send the updated first message (e.g., after updating the first message) to the server (e.g., to the server network device). For example, the pluggable transceiver may send the first message to the server via the network segment B between the pluggable transceiver and the server. In this way, the server may receive the first message from the pluggable transceiver (e.g., via the network segment B).

Figure 2C:
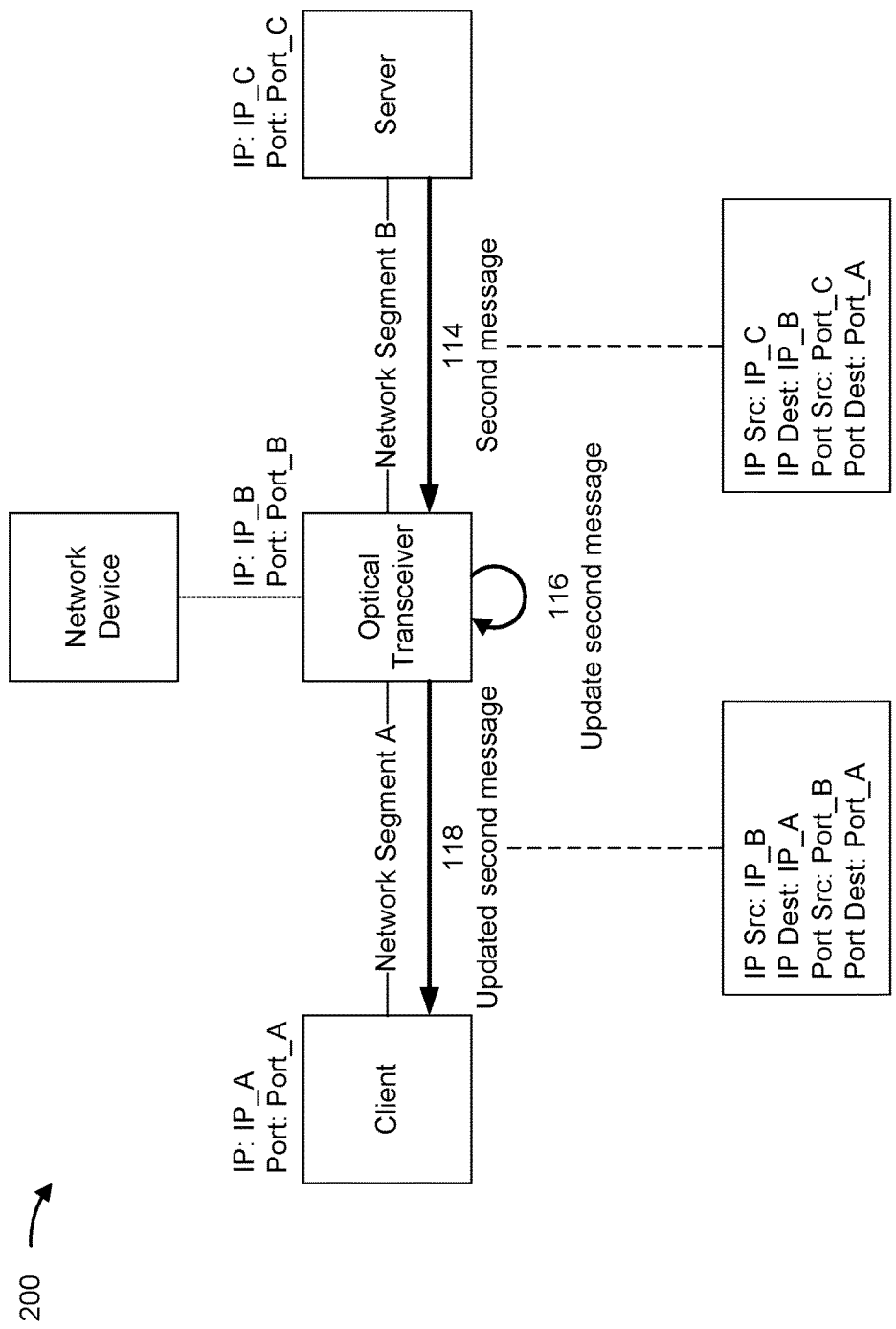

As shown in FIG. 2C, and by reference number 114, the server may send a second message to the pluggable transceiver (e.g., based on receiving the first message, as described herein in relation to FIG. 2B). For example, the server may send the second message to the pluggable transceiver via the network segment B between the server and the pluggable transceiver. In this way, the pluggable transceiver may receive the second message from the server (e.g., via the network segment B).

The server may send the first message to the pluggable transceiver as part of analyzing the network segment A. The second message may be a TCP message, a UDP message, a TCP/IP message, or another type of message. For example, the second message may be a TCP/IP synchronize-acknowledge (SYN-ACK) message, or another type of TCP/IP message. As shown in FIG. 2C, the second message may indicate a source IP address (IP Src) as being the IP address of the server (e.g., of the server network device) (IP_C); a destination IP address (IP Dest) as being the IP address of the pluggable transceiver (IP_B); a source port (Port Src) as being a port of the server (e.g., a port of the server network device, such as a TCP port) (Port_C); and/or a destination port (Port Dest) as being a port of the client (e.g., a TCP port) (Port_A). In some implementations, the second message may include one or more headers, such as a network layer header (e.g., that includes information associated with layer 3 of the OSI model) and/or a transport layer header (e.g., that includes information associated with layer 4 of the OSI model). Accordingly, the network layer header may include the source IP address and the destination IP address, and the transport layer header may include the source port and the destination port.

As shown by reference number 116, the pluggable transceiver may update the second message. For example, the pluggable transceiver, based on receiving the second message from the server, and based on the data structure (e.g., that indicates that the pluggable transceiver is to update messages from the server), may determine to update the second message. Accordingly, the pluggable transceiver may update the network layer header of the second message. For example, as shown in FIG. 2C, the pluggable transceiver may update the second message to indicate the source IP address as being the IP address of the pluggable transceiver (IP_B) and/or the destination IP address as being an IP address of the client (e.g., of the client device) (IP_A). Accordingly, when the network layer header includes a network layer checksum value, the pluggable transceiver may further update the first message to cause the network layer checksum value to be updated (e.g., using the updated source IP and the updated destination IP address). Additionally, or alternatively, the pluggable transceiver may update the transport layer header of the second message. For example, as shown in FIG. 2C, the pluggable transceiver may update the second message to indicate the source port as being the port of the pluggable transceiver (Port_B). Accordingly, when the transport layer header includes a transport layer checksum value, the pluggable transceiver may further update the second message to cause the transport layer checksum value to be updated (e.g., using the updated source port and the destination port).

As shown by reference number 118, the pluggable transceiver may send the updated second message (e.g., after updating the second message) to the client (e.g., to the client network device). For example, the pluggable transceiver may send the second message to the client via the network segment A between the pluggable transceiver and the client. In this way, the client may receive the second message from the pluggable transceiver (e.g., via the network segment A).

Figure 2D:
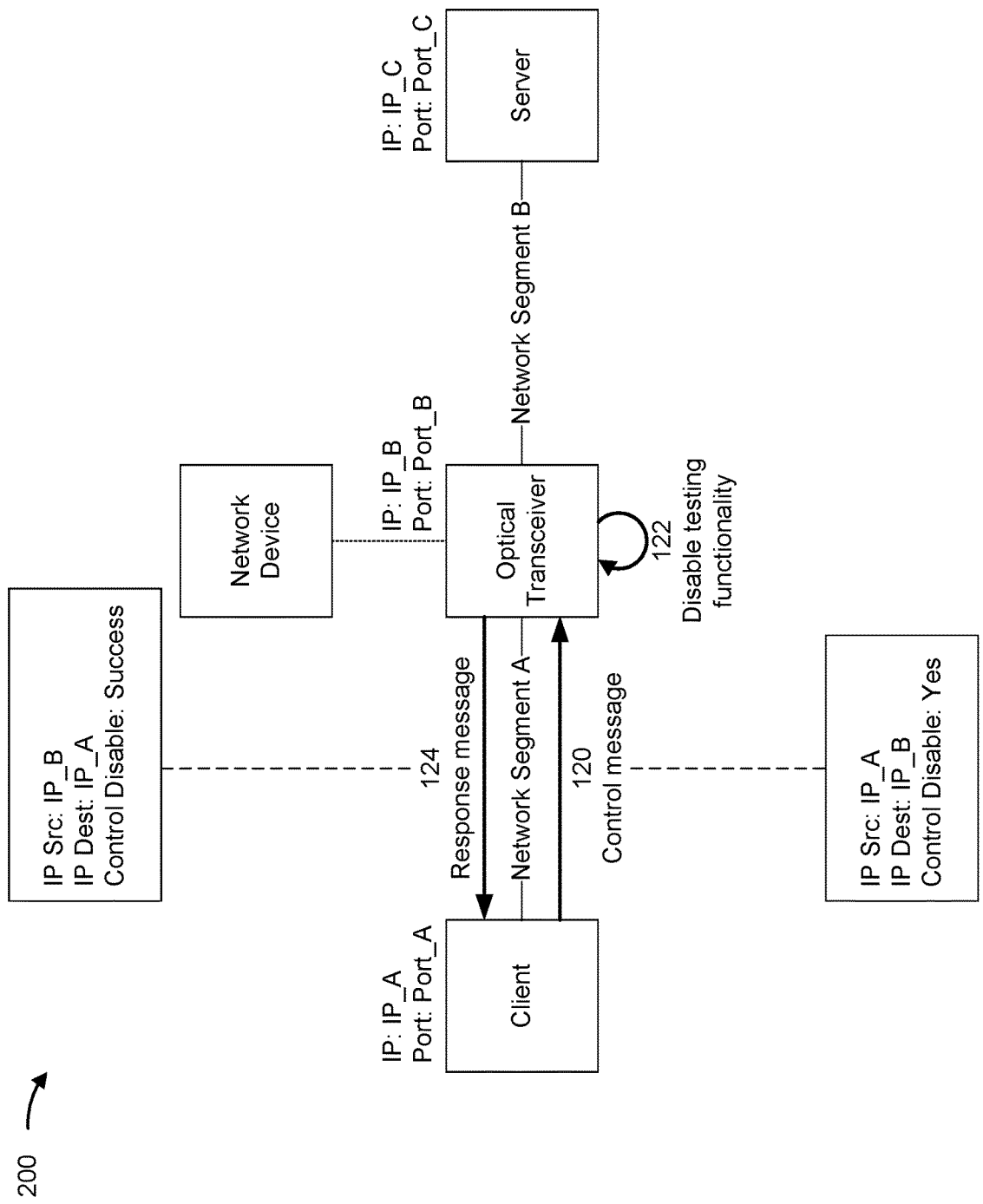

As shown in FIG. 2D, and by reference number 120, the client may send a control message to the pluggable transceiver (e.g., after the first message is sent by the client and after the second message is received by the client). For example, the client may send the control message to the pluggable transceiver via the network segment A between the client and the pluggable transceiver. In this way, the pluggable transceiver may receive the control message from the client (e.g., via the network segment A).

The client may send the control message to the pluggable transceiver to terminate analysis of the network segment A (e.g., to terminate analysis of network traffic communicated via network segment A). As shown in FIG. 2D, the control message may indicate a source IP address (IP Src) as being an IP address of the client (e.g., of the client network device) (IP_A); a destination IP address (IP Dest) as being an IP address of the pluggable transceiver (IP_B); and/or a control disablement parameter (e.g., as being that the pluggable transceiver is to cease updating messages) (Control Disable: Yes).

As shown by reference number 122, the pluggable transceiver may disable the testing functionality of the pluggable transceiver (e.g., based on the control message). For example, the pluggable transceiver may process (e.g., parse and/or read) the control message to determine (e.g., based on the source IP address, the destination IP address of the control message, and the control disablement parameter) that the pluggable transceiver is to cease facilitating analysis of the network segment between the client and the pluggable transceiver (e.g., the network segment A). Accordingly, the pluggable transceiver may update the data structure to indicate that the pluggable transceiver is to not update messages to and/or from the client.

As shown by reference number 124, the pluggable transceiver may send a response message to the client. For example, the pluggable transceiver may send the response message to the client via the network segment A between the pluggable transceiver and the client. In this way, the client may receive the response message from the pluggable transceiver (e.g., via the network segment A).

The pluggable transceiver may send the response message to the client as an acknowledgement of the control message. For example, the pluggable transceiver may send the response message to the client to indicate that the pluggable transceiver has disabled the updating functionality of the pluggable transceiver (e.g., that was used to facilitate analysis of network traffic communicated via the network segment A). As shown in FIG. 2D, the response message may indicate a source IP address (IP Src) as being the IP address of the pluggable transceiver (IP_B); a destination IP address (IP Dest) as being the IP address of the client (e.g., of the client network device) (IP_A); and a control disablement acknowledgement parameter (e.g., that indicates that the pluggable transceiver is configured to cease updating messages).

While FIG. 2D shows the client as terminating analysis of the network segment A, another device or system may be used. For example, the control system (described above) that is configured to monitor and control the devices shown in FIG. 2A may terminate analysis of the network segment A. Accordingly, the control system, in a similar manner as that described above, may send the control message to the pluggable transceiver and may receive the response message from the pluggable transceiver.

As indicated above, FIGS. 2A-2D are provided as an example. Other examples may differ from what is described with regard to FIGS. 2A-2D. The number and arrangement of devices shown in FIGS. 2A-2D are provided as an example. In practice, there may be additional devices, fewer devices, different devices, or differently arranged devices than those shown in FIGS. 2A-2D. Furthermore, two or more devices shown in FIGS. 2A-2D may be implemented within a single device, or a single device shown in FIGS. 2A-2D may be implemented as multiple, distributed devices. Additionally, or alternatively, a set of devices (e.g., one or more devices) shown in FIGS. 2A-2D may perform one or more functions described as being performed by another set of devices shown in FIGS. 2A-2D.

Figure 3:
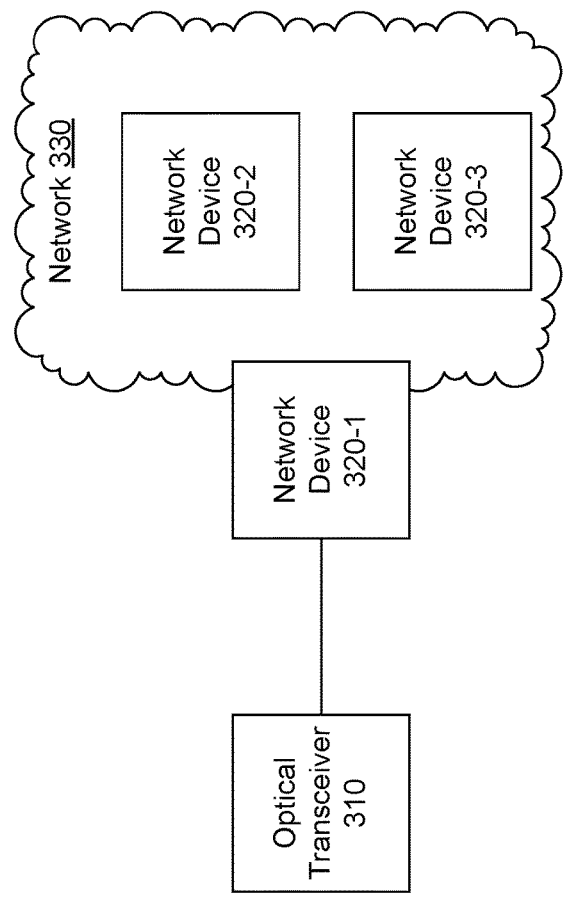
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an pluggable transceiver 310, a plurality of network devices 320 (shown as network devices 320-1 through 320-3; referred to individually as network device 320, and collectively as network devices 320), and a network 330. Devices of environment 300 may interconnect via wired connections, wireless connections, or a combination of wired and wireless connections.

The pluggable transceiver 310 may include one or more devices capable of receiving, processing, storing, routing, and/or providing traffic (e.g., a message and/or other information) in a manner described herein. The pluggable transceiver 310 may be a pluggable pluggable transceiver, such as an SFP pluggable transceiver. The pluggable transceiver 310 may include a receiver module, a transmitter module, and/or a logic module (e.g., as described herein in relation to FIG. 1). The pluggable transceiver 310 may be configured to be included in a network device, such as the network device 320-1 shown in FIG. 3, and may be configured to connect to one or more other network devices (e.g., network device 320-2 and/or network device 320-3 shown in FIG. 3).

The network device 320 may include one or more devices capable of receiving, processing, storing, routing, and/or providing traffic (e.g., a message and/or other information) in a manner described herein. For example, the network device 320 may include a router, such as a label switching router (LSR), a label edge router (LER), an ingress router, an egress router, a provider router (e.g., a provider edge router or a provider core router), a virtual router, or another type of router. Additionally, or alternatively, the network device 320 may include a gateway, a switch, a firewall, a hub, a bridge, a reverse proxy, a server (e.g., a proxy server, a cloud server, or a data center server), a load balancer, and/or a similar device. In some implementations, the network device 320 may be a physical device implemented within a housing, such as a chassis. In some implementations, the network device 320 may be a virtual device implemented by one or more computing devices of a cloud computing environment or a data center. In some implementations, a group of network devices 320 may be a group of data center nodes that are used to route traffic flow through a network.

The network 330 may include one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
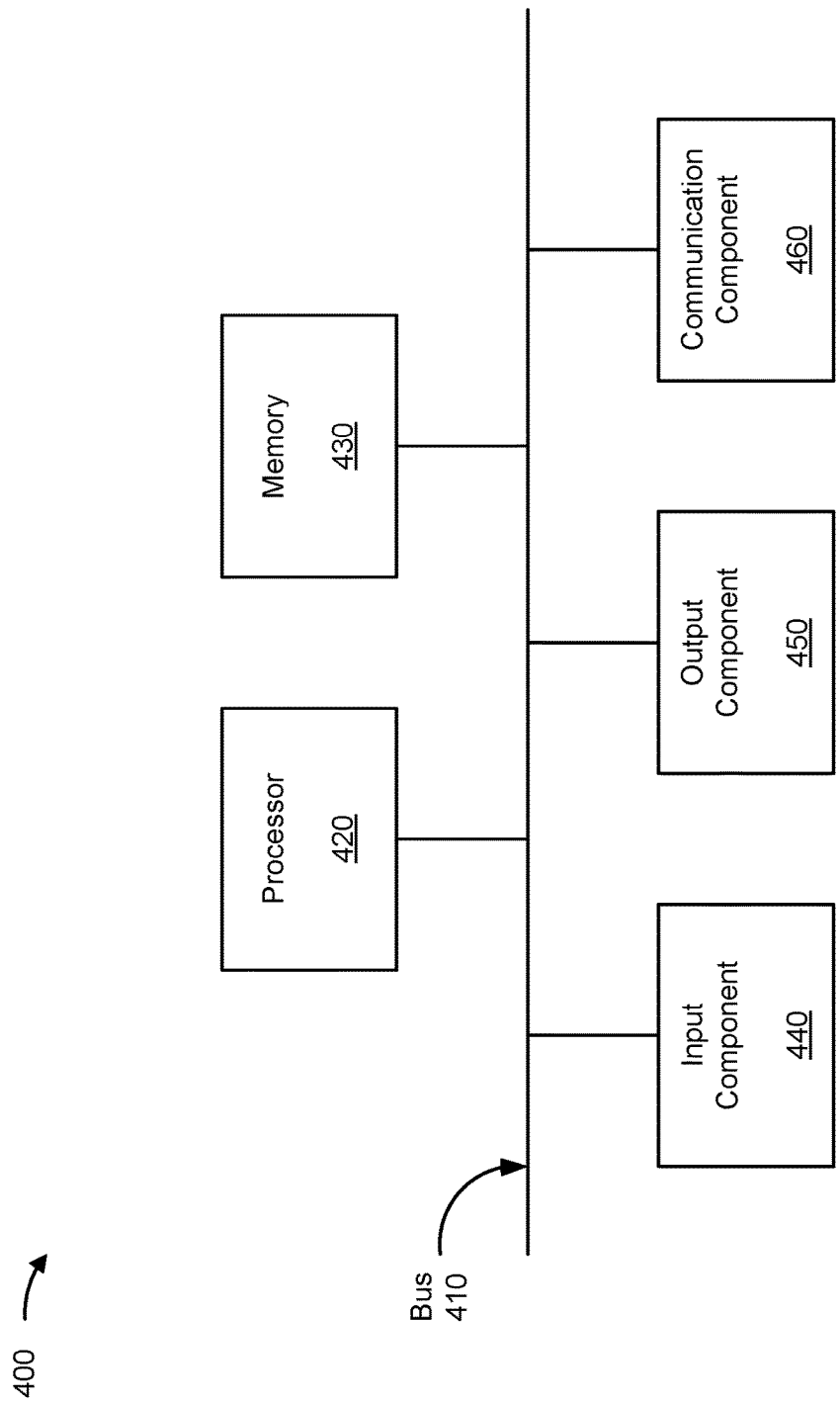
FIG. 4 is a diagram of example components of a device associated with facilitating network traffic analysis.

FIG. 4 is a diagram of example components of a device 400 associated with facilitating network traffic analysis. The device 400 may correspond to the pluggable transceiver 310 and/or the network device 320. In some implementations, the pluggable transceiver 310 and/or the network device 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
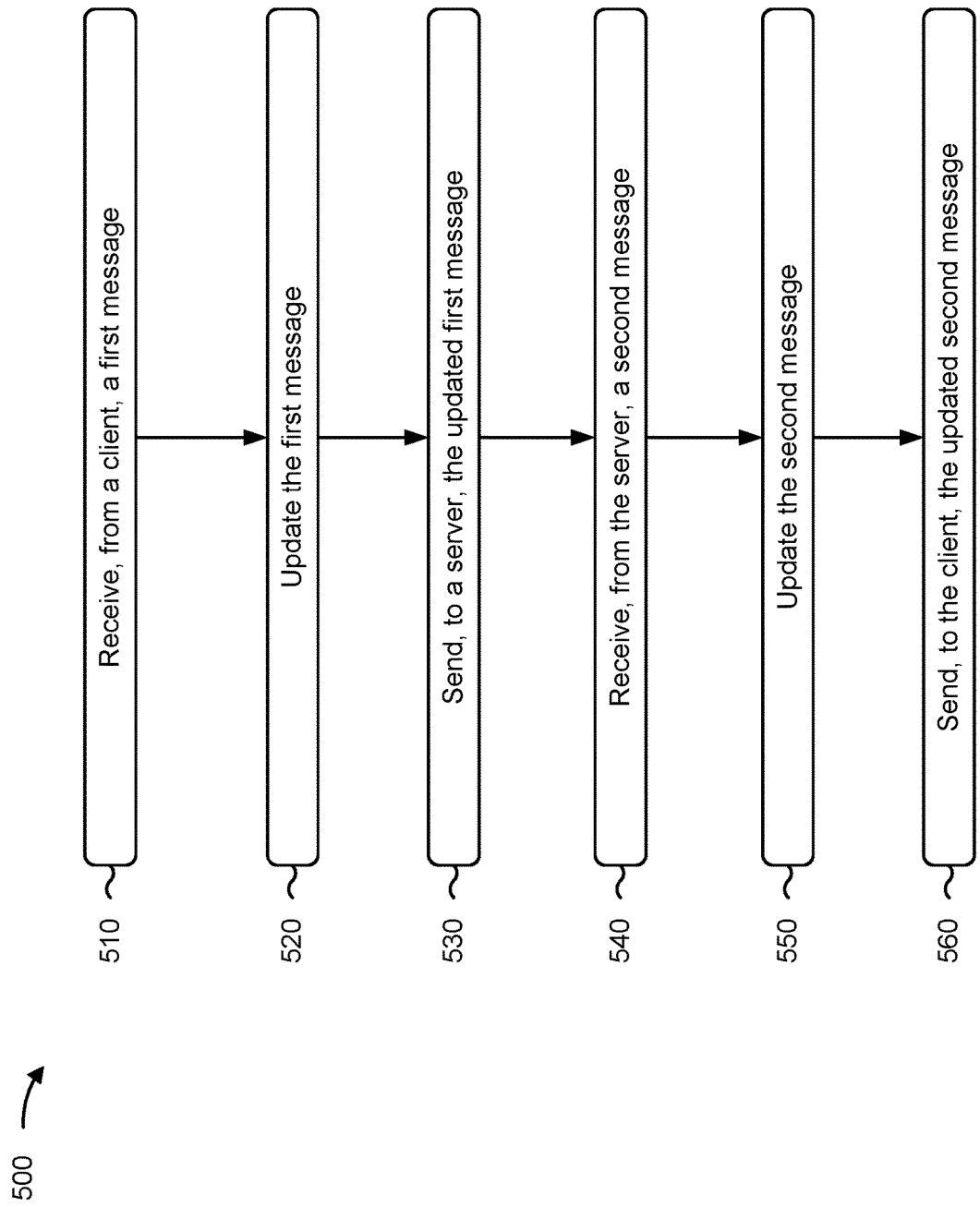
FIG. 5 is a flowchart of an example process associated with facilitating network traffic analysis.

FIG. 5 is a flowchart of an example process 500 associated with facilitating network traffic analysis. In some implementations, one or more process blocks of FIG. 5 are performed by an pluggable transceiver (e.g., the pluggable transceiver 310). In some implementations, one or more process blocks of FIG. 5 are performed by another device or a group of devices separate from or including the pluggable transceiver, such as a network device (e.g., the network device 320). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving, from a client, a first message (block 510). For example, the pluggable transceiver may receive, from a client, a first message, as described above. The first message may indicate a first source IP address as being an IP address of the client, a first destination IP address as being an IP address of the pluggable transceiver, a first source port as being a port of the client, and a first destination port as being a port of the pluggable transceiver.

As further shown in FIG. 5, process 500 may include updating the first message (block 520). For example, the pluggable transceiver may update the first message, as described above. The pluggable transceiver may update the first message to indicate the first source IP address as being the IP address of the pluggable transceiver, the first destination IP address as being an IP address of a server, and the first destination port as being a port of the server.

As further shown in FIG. 5, process 500 may include sending, to the server, the updated first message (block 530). For example, the pluggable transceiver may send, to the server, the updated first message, as described above.

As further shown in FIG. 5, process 500 may include receiving, from the server, a second message (block 540). For example, the pluggable transceiver may receive, from the server, a second message, as described above. The second message may indicate a second source IP address as being an IP address of the server, a second destination IP address as being the IP address of the pluggable transceiver, a second source port as being a port of the server, and a second destination port as being the port of the client.

As further shown in FIG. 5, process 500 may include updating the second message (block 550). For example, the pluggable transceiver may update the second message, as described above. The pluggable transceiver may update the second message to indicate the second source IP address as being the IP address of the pluggable transceiver, the second destination IP address as being the IP address of the client, and the second source port as being the port of the pluggable transceiver.

As further shown in FIG. 5, process 500 may include sending, to the client network device, the updated second message (block 560). For example, the pluggable transceiver may send, to the client network device, the updated second message, as described above.

Process 500 may include additional implementations, such as any single implementation or any combination of implementations described below and/or in connection with one or more other processes described elsewhere herein.

In a first implementation, the pluggable transceiver is configured to be included in another network device, wherein the pluggable transceiver is configured to connect to the client via a first network segment, and the pluggable transceiver is configured to connect to the server via a second network segment.

In a second implementation, alone or in combination with the first implementation, updating the first message includes causing at least one of a network layer checksum value of the first message to be updated, or a transport layer checksum value of the first message to be updated.

In a third implementation, alone or in combination with one or more of the first and second implementations, updating the second message includes causing a network layer checksum value of the second message to be updated.

In a fourth implementation, alone or in combination with one or more of the first through third implementations, process 500 includes receiving, prior to receiving the first message and receiving the second message, a control message that indicates a third source IP address as being the IP address of the client, a third destination IP address as being the IP address of the pluggable transceiver, a control enablement parameter, and a server identifier parameter as being the IP address of the server, and sending, based on receiving the control message, a response message that indicates a fourth source IP address as being the IP address of the pluggable transceiver, a fourth destination IP address as being the IP address of the client, and a control enablement acknowledgement parameter.

In a fifth implementation, alone or in combination with one or more of the first through fourth implementations, process 500 includes receiving, after sending the first message and sending the second message, a control message that indicates a third source IP address as being the IP address of the client, a third destination IP address as being the IP address of the pluggable transceiver, and a control disablement parameter, and sending, based on receiving the control message, a response message that indicates a fourth source IP address as being the IP address of the pluggable transceiver, a fourth destination IP address as being the IP address of the client, and a control disablement acknowledgement parameter.

In a sixth implementation, alone or in combination with one or more of the first through fifth implementations, at least one of: the IP address of the client, the IP address of the pluggable transceiver, and the IP address of the server are different, or the port of the pluggable transceiver and the port of the server are the same.

In a seventh implementation, alone or in combination with one or more of the first through sixth implementations, at least one of: the IP address of the client and the IP address of the server are the same, or the port of the pluggable transceiver and the port of the server are the same.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A pluggable transceiver, comprising:
one or more hardware processors, configured to:
receive, from a client network device, a first control message that includes a control enablement parameter and a server identifier parameter that indicates an Internet protocol (IP) address of a server network device;
receive, from the client network device and after receiving the first control message, a first message that indicates a first source IP address as being an IP address of the client network device, a first destination IP address as being an IP address of the pluggable transceiver, a first source port as being a port of the client network device, and a first destination port as being a port of the pluggable transceiver;
update the first message to indicate the first source IP address as being the IP address of the pluggable transceiver, the first destination IP address as being the IP address of the server network device, and the first destination port as being a port of the server network device;

send, to the server network device, the updated first message;

receive, from the server network device and after receiving the first control message, a second message that indicates a second source IP address as being an IP address of the server network device, a second destination IP address as being the IP address of the pluggable transceiver, a second source port as being a port of the server network device, and a second destination port as being the port of the client network device;

update the second message to indicate the second source IP address as being the IP address of the pluggable transceiver, the second destination IP address as being the IP address of the client network device, and the second source port as being the port of the pluggable transceiver; and send, to the client network device, the updated second message.

2. The pluggable transceiver of claim 1, wherein the pluggable transceiver is configured to be included in another network device, wherein:

the pluggable transceiver is configured to connect to the client network device via a first network segment, and the pluggable transceiver is configured to connect to the server network device via a second network segment.

3. The pluggable transceiver of claim 1, wherein updating the first message includes causing at least one of:

a network layer checksum value of the first message to be updated, or a transport layer checksum value of the first message to be updated.

4. The pluggable transceiver of claim 1, wherein updating the second message includes causing a network layer checksum value of the second message to be updated.

5. The pluggable transceiver of claim 1, wherein the first control message further indicates a third source IP address as being the IP address of the client network device and a third destination IP address as being the IP address of the pluggable transceiver, and wherein the one or more hardware processors are further configured to:

send, based on receiving the control message, a response message that indicates a fourth source IP address as being the IP address of the pluggable transceiver, a fourth destination IP address as being the IP address of the client network device, and a control enablement acknowledgement parameter.

6. The pluggable transceiver of claim 1, wherein the one or more hardware processors are further configured to:

receive, after sending the first message and sending the second message, a second control message that indicates a third source IP address as being the IP address of the client network device, a third destination IP address as being the IP address of the pluggable transceiver, and a control disablement parameter; and send, based on receiving the second control message, a response message that indicates a fourth source IP address as being the IP address of the pluggable transceiver, a fourth destination IP address as being the IP address of the client network device, and a control disablement acknowledgement parameter.

7. The pluggable transceiver of claim 1, wherein at least one of:

the IP address of the client network device, the IP address of the pluggable transceiver, and the IP address of the server network device are different, or the port of the pluggable transceiver and the port of the server network device are the same.

8. The pluggable transceiver of claim 1, wherein at least one of:

the IP address of the client network device and the IP address of the server network device are the same, or the port of the pluggable transceiver and the port of the server network device are the same.

9. A pluggable transceiver, comprising:

one or more hardware processors, configured to:

receive a first message that includes a first network layer header and a first transport layer header, wherein the first network layer header indicates a first source Internet protocol (IP) address as being an IP address of a client and a first destination IP address as being an IP address of the pluggable transceiver, and wherein the first transport layer header indicates a first source port as being a port of the client and a first destination port as being a port of the pluggable transceiver;

update the first network layer header and the first transport layer header of the first message to indicate the first source IP address as being the IP address of the pluggable transceiver, the first destination IP address as being an IP address of a server, and the first destination port as being a port of the server;

send, after updating the first network layer header and the first transport layer header of the first message, the first message;

receive a second message that includes a second network layer header and a second transport layer header, wherein the second network layer header indicates a second source IP address as being an IP address of the server and a second destination IP address as being the IP address of the pluggable transceiver, and wherein the second transport layer header indicates a second source port as being a port of the server and a second destination port as being the port of the client;

update the second network layer header and the second transport layer header of the second message to indicate the second source IP address as being the IP address of the pluggable transceiver, the second destination IP address as being the IP address of the client, and the second source port as being the port of the pluggable transceiver;

send, after updating the second network layer header of the second message, the second message; and receive, after sending the first message and sending the second message, a first control message that includes a control disablement parameter.

10. The pluggable transceiver of claim 9, wherein the pluggable transceiver is configured to be included in a network device.

11. The pluggable transceiver of claim 10, wherein the client is associated with a first other network device and the server is associated with a second other network device.

12. The pluggable transceiver of claim 10, wherein the client and the server are each associated with another network device.

13. The pluggable transceiver of claim 10, wherein the one or more hardware processors are further configured to:

receive, prior to receiving the first message and receiving the second message, a second control message that includes a control enablement parameter and a server identifier parameter that indicates the IP address of the server; and send, after receiving the second control message, a response message that includes a control enablement acknowledgement parameter.

14. The pluggable transceiver of claim 10, wherein the one or more hardware processors are further configured to:

send, after receiving the first control message, a response message that includes a control disablement acknowledgement parameter.

15. A method, comprising:

receiving, by a pluggable transceiver, a first message that indicates a first source Internet protocol (IP) address as being an IP address of a client, a first destination IP address as being an IP address of the pluggable transceiver, a first source port as being a port of the client, and a first destination port as being a port of the pluggable transceiver;

sending, by the pluggable transceiver, the first message, wherein the first message is updated to indicate the first source IP address as being the IP address of the pluggable transceiver, the first destination IP address as being an IP address of a server, and the first destination port as being a port of the server;

receiving, by the pluggable transceiver, a second message that indicates a second source IP address as being an IP address of the server, a second destination IP address as being the IP address of the pluggable transceiver, a second source port as being a port of the server, and a second destination port as being the port of the server;

sending, by the pluggable transceiver, the second message, wherein the second message is updated to indicate the second source IP address as being the IP address of the pluggable transceiver, the second destination IP address as being the IP address of the client, and the second source port as being the port of the pluggable transceiver; and receiving, by the pluggable transceiver, at least one of a first control message, before the first message and the second message, or a second control message, after the first message and the second message, wherein at least one of:

the first control message includes a control enablement parameter and a server identifier parameter that indicates the IP address of the server, or the second control message includes a control disablement parameter.

16. The method of claim 15, wherein the IP address of the client, the IP address of the pluggable transceiver, and the IP address of the server are different.

17. The method of claim 15, wherein the IP address of the client and the IP address of the server are the same.

18. The method of claim 15, wherein the port of the pluggable transceiver and the port of the server are the same.

19. The method of claim 15, wherein the client is associated with a first network device and the server is associated with a second other network device.

20. The method of claim 15, wherein the client and the server are each associated with a network device.

\* \* \* \* \*